Oct. 13, 1964  A. S. BOHRER  3,152,625
SCROLL SAW

Filed June 25, 1962  3 Sheets-Sheet 1

INVENTOR.
ALPHONSE S. BOHRER
BY Ralph W. Kalish
ATTORNEY

Oct. 13, 1964  A. S. BOHRER  3,152,625
SCROLL SAW

Filed June 25, 1962  3 Sheets-Sheet 2

INVENTOR.
ALPHONSE S. BOHRER
BY Ralph W. Kalish

ATTORNEY

United States Patent Office 3,152,625
Patented Oct. 13, 1964

3,152,625
SCROLL SAW
Alphonse S. Bohrer, 633 Military Road, Lemay, Mo.
Filed June 25, 1962, Ser. No. 204,810
6 Claims. (Cl. 143—72)

This invention relates in general to cutting machines and, more particularly, to certain new and useful improvements in a motor-driven scroll saw, of the type often commonly referred to as a "jig" saw.

It is an object of the present invention to provide a scroll saw having a blade with a normally free upper end which is adapted for extension upwardly through an opening in a work piece to be received in non-engaged relation within an upper guide, so that during operation the saw blade is fully supported in vertical position.

It is another object of the present invention to provide a scroll saw of the type stated which permits of facile automatic, downward withdrawal of the saw blade through the work without necessitating disengagement of the blade from its carrier, allowing for rapid positioning of a successive work piece, and which is adapted for return of the saw blade to operative relationship with respect to the work without necessitating the effecting of positive securement of the blade to the upper guide. Thus, the present invention obviates the heretofore time-consuming, and hence costly, procedure for positively engaging a saw blade to both upper and lower guides prior to operation and similarly requiring its disengagement from such guides upon termination of each operation.

It is a further object of the present invention to provide a scroll saw which is adapted to effect immediate withdrawal of a blade from its terminating position within a work piece without requiring the heretofore customary manipulation of the work for relatively redirecting the blade to its starting opening before withdrawal of same.

It is an additional object of the present invention to provide a scroll saw which incorporates novel means for effecting insertion of the blade within the work and withdrawal therefrom while the machine is in a running state, but wherein, through an unusual clutch arrangement, the sawing operation is not initiated until the blade has been received within the upper guide.

It is another object of the present invention to provide a scroll saw of the type stated which allows for high-speed and, hence, high-volume operation; which effects positioning and withdrawal of the saw blade through novel automatic means; which may be most economically produced; which may be readily adapted to existing scroll saw machines; and which is highly reliable in operation.

Other objects and details of the invention will be apparent from the following description, when read in connection with the accompanying drawings (three sheets), wherein—

Figures 1, 2, 3:
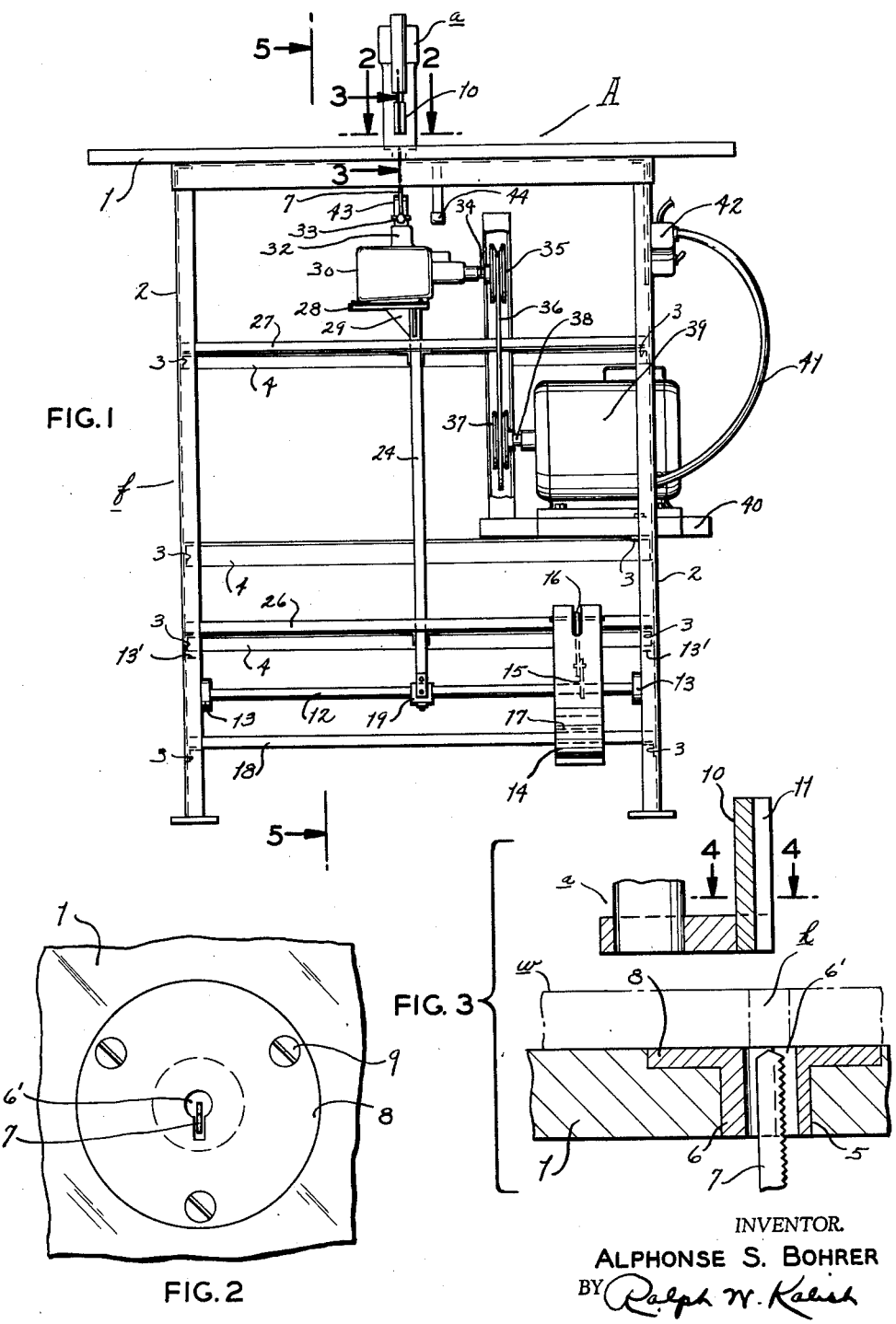
FIGURE 1 is a front view of a scroll saw constructed in accordance with and embodying the present invention.
FIGURE 2 is a horizontal view taken on the line 2—2 of FIGURE 1.
FIGURE 3 is a vertical transverse sectional view taken on the line 3—3 of FIGURE 1.
Figure 4:
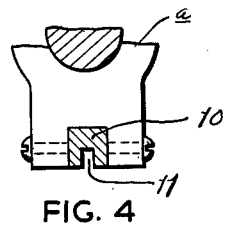
FIGURE 4 is a transverse sectional view taken on the line 4—4 of FIGURE 3.

Referring now by reference characters to the drawings which illustrate the preferred embodiment of the present invention, A designates generally a scroll saw, or more commonly called "jig" saw, comprising a base frame, indicated $f$, for a work-support plate 1; said frame $f$ being constituted of corner legs 2, and a plurality of vertically spaced-apart horizontal members 3, 4 extending lengthwise and transversely, respectively, of said frame $f$, between adjacent legs 2. Said frame components are fabricated of any suitable rigid material such as, for instance, angle iron. Plate 1, however, may be formed of wood, if desired, and dimensioned for extension outwardly beyond frame $f$ to provide an enlarged work-receiving area for accommodating sheets of work material $w$, as of wood, within which internal cutting is to be effected. Said plate 1 is provided with an opening 5 having fitted therein a sleeve-like guide 6 having a bore 6' of generally keyhole shape in cross-section open at both ends, for extension therethrough of a scroll saw blade 7, as of the well known sabre type. Guide 6 may be integrally formed to provide at its upper end a flat, radially extending flange 8 for reception within a complementary recess in plate 1 so that its upper surface is flush therewith; there being screws 9 utilized for securing guide member 6 in position.

Presented at a pre-determined distance above plate 1, as by an arm $a$, is an overhanging guide 10 having a vertically disposed, forwardly opening way 11, aligned with guide bore 6', for receiving the normally free upper end portion of saw blade 7 during operation for supporting same in vertical operative position. The means, such as arm $a$, for supporting guide 10 does not form a part of the present invention, as it is quite obvious that the same could be adapted for vertical adjustability, if preferred.

Carried beneath plate 1 on frame $f$ is a novel structure for effecting presentation to, and withdrawal from, work piece $w$ of saw blade 7, which structure incorporates a rock shaft 12 extending transversely across frame $f$, adjacent its lower end and with the ends of said shaft 12 being suitably journaled in bearings 13 provided on side plates 13'. Said shaft 12 adjacent one of its ends is operatively engaged to a foot pedal 14 by means of a pair of connecting arms or links 15, 16; said foot pedal 14 being hingedly mounted, as at 17, upon a support bar 18.

Figure 5:
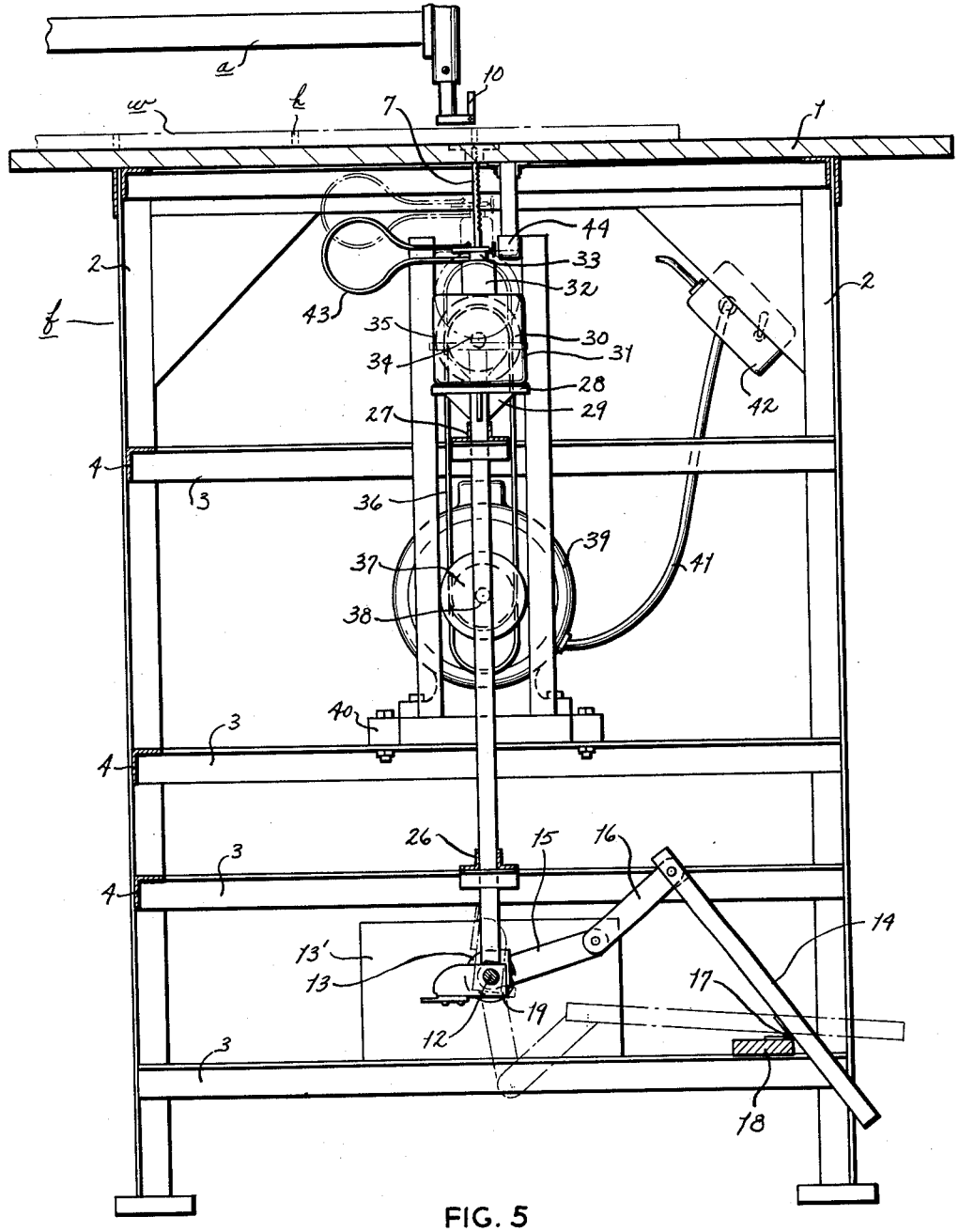
FIGURE 5 is a vertical transverse sectional view taken on the line 5—5 of FIGURE 1.

Foot pedal 14 will be normally biased, by means presently described, into upward position at its inner or toe end (see full lines in FIGURE 5), with connecting arms 15, 16 in generally extended relationship. Upon downward rocking or depression of foot pedal 14, by application of pressure on its inner end, into the position shown in phantom lines in FIGURE 5, connecting arms 15, 16 will be collapsed, as it were, effecting a rocking of shaft 12 through an angle of approximately ninety degrees, causing an upward swinging of a cam member 19 carried thereon for movement therewith. Cam 19 is relatively elongate and is fixed on shaft 12 for projection radially rearwardly therefrom, substantially axially parallel to the support surface, when pedal 14 is in up position, so that the same will be swung into vertical position upon rocking of shaft 12 on lowering of foot pedal 14. The normally upwardly presented and rearward end faces of cam 19 constitute a continuous operating surface 20, which former face portion is substantially linear and the latter portion is rounded, as at 20'. Engaged on the normally undersurface of cam 19 is a stop plate 21 which extends beyond rounded cam surface 20', as at 21'; said stop plate 21 and cam surface 20' cooperating to define a rearwardly opening recess for purposes appearing below. On its forward end face cam 19 mounts an end plate 23 which projects above the upper face of cam 19 for supporting and directing abutment on its rearward face against the lower forward end portion of a rod 24, preferably of square cross-section. The bottom face of rod 24, which rides on operating surface 20 of cam 19, is formed on a slight upward and rearward inclination and integrally incorporates along its rearward edge a depending locking projection or tongue 25, contoured for reception within recess 22. Thus, as cam 19 is swung upwardly, its operating edge 20 will move relatively along the bottom face of rod 24, causing same to be raised or lifted thereby, with such elevating movement being terminated by reception of tongue 25 within recess 22, all as may best be seen in FIGURE 6. Stop plate 21 will be thereby brought into supporting engagement against the rearward lower end face of rod 24, while end plate 23 will have been removed from engagement therewith.

Rod 24 extends vertically upwardly, axially normal to plate 1, being thus adapted for reciprocal movement toward and away from same by operation of cam 19. Vertically spaced apart guides 26, 27, as constituted of cooperating angle members suitably supported from frame f, serve to maintain rod 24 within its axial path of travel. At its upper end, above guide 27 and spacedly below plate 1, said rod 24 mounts a flat horizontal plate 28 reinforcedly fixed to rod 24 as by gussets 29. On its upper surface flat plate 28 mounts a reciprocating unit, indicated generally at 30, of a type well known in the art, the specific construction of which does not form a part of the present invention. Said unit 30 comprises a casing 31 having integrally on its upper surface an upwardly extending tubular housing 32 for reciprocating vertical movement therein of a piston (not shown) having at its upper end a saw blade chuck 33 for securement therein of the lower end of saw blade 7. Projecting laterally from casing 31 is a horizontally disposed, driven shaft 34 carrying at its outer end a pulley 35 about which is trained the upper portion of an endless drive belt 36. The lower end portion of said belt 36 extends about a similar type pulley 37 engaged upon the drive shaft 38 of a prime mover 39, which latter is suitably supported upon a mounting plate 40 bolted or otherwise secured upon frame f. Prime mover 39 is connected, as by conductor 41, to a control panel 42, which is, in turn, engaged to a source of electric power.

Reciprocating unit 30 is adapted, as stated, for effecting vertical reciprocal movement of saw blade 7 for effecting cutting operation thereof. Various means have been heretofore developed for causing such reciprocal movement, such as, for example, by utilization of an eccentric cam (not shown) being operatively connected to shaft 34, so that upon rotation of the latter a reciprocating movement will be imparted by the eccentric to the saw blade-carrying piston.

A flat spring member, as shown in 43, which is doubled upon itself so as to form an enlarged loop, is engaged at one end upon housing 32 and at its other, opposed end to saw blade chuck 33 so as to urge the latter, with saw blade 7 therein, downwardly. There is also provided a stop member 44 which depends from the under-surface of plate 1 having a preferably hard rubber lower terminal portion for abutment against the upper surface of casing 31 for stabilizing the same in upper position.

When saw A is in non-operative condition, the upper end of saw blade 7 will be just below the upper surface of plate 1 (see FIGURE 3) and foot pedal 14 will be upwardly disposed at its inner or rearward end, with cam 19 in rearward or downward position, and rod 24, hence, in lower position. To present saw blade 7 in operating relation to work w, it is necessary that the same be previously elevated for reception at its upper end within way 11 of guide 10. Thus, the present invention involves a critical interdependence of elements to assure of such addressing of saw blade 7 to work w. The length of cam 19 is immediately related to the distance between the upper face of plate 1 and way 11 of guide 10, so that upon upward swinging of cam 19 saw blade 7 will be brought into received relationship within said way 11. It will also be noted, as with reference to FIGURE 1, that when rod 24 is in lower position, as shown in full lines in FIGURE 5, the lower portion of drive belt 36 will extend below lower pulley 37, being out of engagement therewith, so that there will be no effective connection for motion transmission between shafts 38 and 34 until saw blade 7 is in proper operating position.

Figure 8:
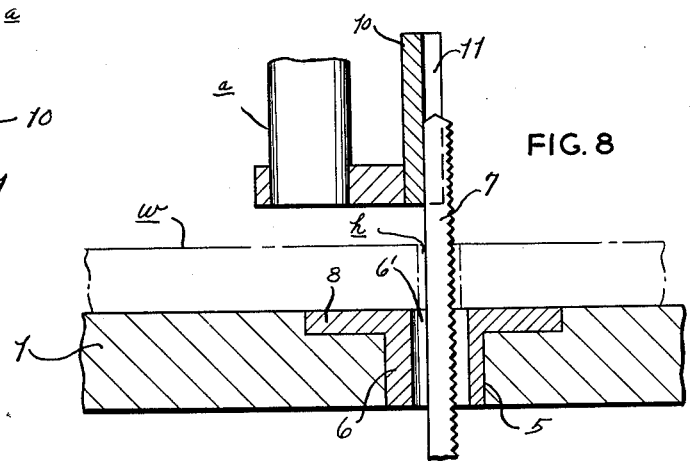
FIGURE 8 is a vertical transverse sectional view taken substantially on the line 3—3 of FIGURE 1 but illustrating the saw in elevated, operative position.
Figure 7:
FIGURE 7 is a horizontal transverse sectional view taken on the line 7—7 of FIGURE 6.

In actual operation, with prime mover 39 energized, drive shaft 38 rotating, and rod 24 being in lower position, there may be placed on work plate 1 a work piece w having an internal opening h, which latter is aligned with bore 6′ of blade guide 6. The operator will thereupon press downwardly upon the toe or inner end of foot pedal 14, causing upward rocking of cam 19, with consequent raising of rod 24, resulting in upward movement of saw blade 7 through bore 6′, opening h and work w, and into way 11 (see FIGURE 8). As rod 24 is elevated, the lower end of drive belt 36 will be moved relatively toward drive pulley 37 and will be brought into engagement therewith upon arrival of the upper end of saw blade 7 in way 11, so that blade 7 is thus properly presented to the work w prior to activation of reciprocating unit 30 to bring about operation of saw blade 7. The upper travel of rod 24 is accomplished in advance of operation of blade 7. The arrangement of pulleys 35, 37 together with belt 36 conduces to a novel clutch action, so that motion transmission is timed in relation to the initiation of upward movement of rod 24 from lower position.

Figure 6:
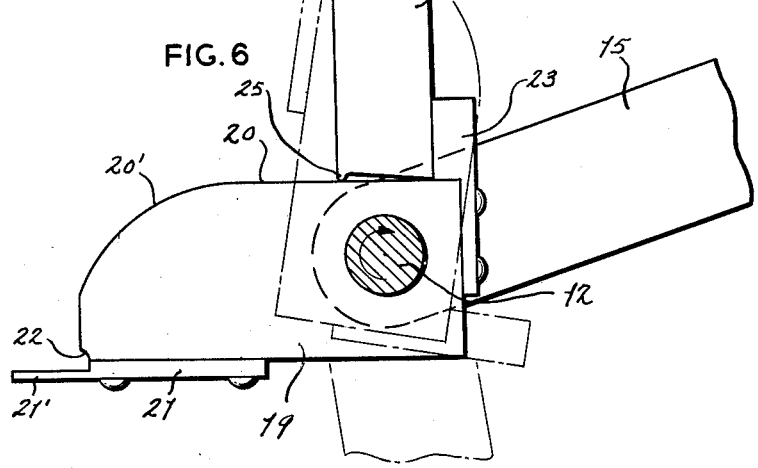
FIGURE 6 is a fragmentary enlarged view in partial section illustrating the operation of the elevating cam and associated parts.

With saw blade 7 reciprocating, the operator will manipulate work piece w with respect thereto for effecting the desired cut, and when the same has been completed the operator need merely press downwardly on the outer or heel end of pedal 14 to cause disengagement of tongue 25 from recess 22, whereby shaft 12 will returningly rotate, as in a counter-clockwise direction, as viewed in FIGURE 6, with cam 19 being thereby swung rearwardly and downwardly, allowing rod 24 to descend into lower or original position. Substantially coincidental with the initiation of the downward movement of rod 24, drive belt 36 will be removed from drive pulley 37, whereby unit 30 will be deactivated with stoppage of reciprocation of saw blade 7. Accordingly, saw blade 7 may be returned to its starting condition, as shown in FIGURE 3, being withdrawn downwardly through the cut which it had theretofore made in work w. The operator may thereupon shift or turn work w so as to place another internal opening above bore 6′, so that the next successive operation of saw blade 7 will effect a further intended cutting in the same work piece, or, the cut work piece may be replaced by an appropriately positioned new work piece. Thereupon, the operator will reinstitute the cycle of action above described, effecting vertical upward shifting of saw blade 7 with consequent energization of reciprocating unit 30 and after causing the desired cut to be effected, will cause de-energization of unit 30 with consequent lowering of saw blade 7. It should be recognized that it is not necessary to de-energize prime mover 39, as the same may be in a constant running condition at all times, but that the same will be intermittently operatively engaged to reciprocating unit through the clutch action above described.

The present invention marks a most decided step forward in the scroll saw art since, as it does not require the positive engagement of the upper end of the saw blade with the overhanging guide, its use is conducive to rapid, economic, high-volume production. Heretofore, in order to effect a line of cutting by sawing from an internal opening in a work piece, it has been a condition precedent to operation that the saw blade be manually extended through the internal opening and then be positively engaged at its opposite ends to the upper and lower chucks or holders. Similarly, upon termination of the particular sawing operation, it has been necessary to "back" the saw blade relatively through its line of cutting to the initial starting opening, and then to disengage the blade at both of its ends so that the work could be removed and allow for either replacement by succeeding work piece or the further positioning of the same work piece for additional sawing. The upper end of the saw blade of the present invention is not positively engaged to the upper guide, although it is adequately and reliably supported therein and hence it may be freely and readily lowered or withdrawn to permit rapid and accurate placement of the following work piece, with said blade being adapted for prompt restoration to elevated operative position, without the necessity of any intervening, time-consuming steps for engaging and disengaging the blade at its opposite ends.

From the foregoing it is quite apparent that the present invention constitutes a substantial improvement over current structures and one which effects considerable economies in operation. Scroll saw A is comprised of a simplicity of parts which are most durable and hence not disposed to breakdown. Furthermore, the present invention can be readily adapted to existing scroll saws, if desired.

It is understood that changes and modifications in the formation, construction, arrangement, and combination of the several parts of the Scroll Saw may be made and substituted for these herein shown and described without departing from the nature and principle of my invention.

Having thus described my invention, what I claim and desire to secure by Letters Patent is:

1. A scroll saw comprising a work-receiving surface having an opening therein, a guide disposed spacedly above said opening, a vertically presented saw blade for movement through said opening and for receipt by said guide when in operative position, a unit for effecting reciprocating movement of said saw engaged to said saw at its lower end beneath said work-receiving surface, a prime mover, motion-transmitting means presented for engagement of said prime mover and said reciprocating unit, an elongated rigid rod for carrying said reciprocating unit being presented in axially normal relationship to the work-support surface and adapted for free vertical movement, a rock shaft provided beneath the lower end of said rod in perpendicular relationship thereto, cam means interengaging the said rock shaft and the lower end face of said rod so that upon swinging of said shaft, said rod member, together with the reciprocating unit and saw blade, will be elevated to present the saw blade in operative position, means for effecting rocking of said shaft, and clutch means for effecting interengagement of said prime mover and said saw reciprocating unit after said saw has been presented in operative position.

2. A scroll saw comprising a work support surface having an opening therethrough, a saw blade guide disposed above the work-support surface opening, a vertically disposed saw blade for projection upwardly through said opening for reception in said guide, a reciprocating unit operatively engaged to said saw at the latter's lower end beneath said work-support surface, a vertically disposed elongated rigid rod presented beneath said work-support surface for carrying said reciprocating unit, a rock shaft presented in axially normal relationship to said rod and beneath the lower end thereof, a cam fixed on said rock shaft for pivoting therewith and having an operating surface with a linear portion and a curvi-linear portion, said rod together with the said reciprocating unit being adapted for free vertical movement and biased downwardly by gravity with the lower end of said rod being normally supported upon said linear portion of the operating surface of said cam, the lower end face of said rod being formed complementarily to the curvi-linear portion of the operating surface of said cam for locking engagement therewith upon rocking of said shaft for effecting movement of said rod into saw-operative position.

3. A scroll saw comprising a work-receiving surface having an opening therethrough, a frame for supporting said work-receiving surface, a saw blade guide disposed spacedly above said opening, a vertically presented saw blade being free at its upper end, a reciprocating unit disposed below said work-receiving surface and being engaged to said saw blade at its lower end for effecting reciprocating vertical movement of said saw blade, said reciprocating unit having a shaft, a vertically presented elongated rigid rod, said reciprocating unit being carried on the upper portion of said rod, a rock shaft disposed below the lower end of said rod, cam means interengaging said rod at its lower end and said rock shaft for effecting vertical movement of said rod together with said reciprocating unit for presenting said saw for operation, a prime mover, and motion-transmitting means connecting said prime mover and the shaft of said reciprocating unit for effecting operation of the latter for reciprocal action of said saw blade.

4. A scroll saw as defined in claim 3 and further characterized by said prime mover being stationarily mounted on said frame beneath said reciprocating unit whereby said saw reciprocating unit is shiftable vertically relatively to said prime mover upon operation of said vertical moving means, a shaft mounted on said prime mover, said saw blade reciprocating unit having a shaft in axially parallel relation to and above the prime mover shaft, said motion-transmitting means comprising a pulley mounted on each of said shafts, a drive belt adapted for connecting said pulleys, said drive belt having an effective length greater than the distance between the opposite outer portions of said pulleys when said saw blade is in lowered or inoperative position so that the lower end of said belt is spacedly below, and hence out of engagement with, said prime mover shaft, whereby upon elevation of said saw blade, said drive belt will be brought into motion transmitting relation with respect to said prime mover and said reciprocating unit.

5. A scroll saw comprising a work-receiving surface having an opening therethrough, a frame for supporting said work-receiving surface, a saw blade guide disposed spacedly above said opening, a vertically presented saw blade being free at its upper end, a reciprocating unit engaged to said saw blade at the latter's lower end, said reciprocating unit having a shaft, means for vertically moving said reciprocating unit and said saw blade between operative position wherein the free upper end of said blade is received within said guide and inoperative position wherein the said free upper end is located below said work-receiving surface, a prime mover having a drive shaft, a first pulley mounted on the said drive shaft, a second pulley mounted on the shaft of said reciprocating unit, and a drive belt extending between said first and second pulleys, said drive belt having a length greater than the distance between said pulleys when the saw blade is in lower or inoperative position so as to prevent motion transmission in such condition whereby upon upward vertical shifting of said blade and reciprocating unit the said drive belt will operatively connect said first and second pulleys.

6. A scroll saw comprising a work-receiving surface having an opening therein, a guide disposed spacedly above said opening, a vertically presented saw blade for movement through said opening and for receipt by said guide when in operative position, a unit for effecting reciprocating movement of said saw engaged to said saw at its lower end beneath said work-receiving surface, a prime mover, motion-transmitting means presented for engagement of said prime mover and said reciprocating unit, an elongated rigid rod for carrying said reciprocating unit being presented in axially normal relationship to the work-support surface and adapted for free vertical movement, a rock shaft provided beneath the lower end of said rod in perpendicular relationship thereto, cam means interengaging the said rock shaft and the lower end face of said rod so that upon swinging of said shaft, said rod member together with the reciprocating unit and saw blade will be elevated to present the saw blade in operative position, means for effecting rocking of said shaft, and means for effecting interengagement of said prime mover and said saw reciprocating unit after said saw has been presented in operative position.

References Cited in the file of this patent

UNITED STATES PATENTS

| | | |
|---|---|---|
| 143,650 | Weller | Oct. 14, 1873 |
| 198,426 | Stafford | Dec. 18, 1877 |
| 1,211,456 | Lacey | Jan. 9, 1917 |
| 2,327,239 | Bartlett | Aug. 17, 1943 |
| 2,459,373 | Gettys | Jan. 18, 1949 |